United States Patent
Schwarz et al.

(10) Patent No.: US 10,018,120 B2
(45) Date of Patent: Jul. 10, 2018

(54) GAS TURBINE ENGINE CONTROL FOR ROTOR BORE HEATING

(71) Applicant: United Technologies Corporation, Hartford, CT (US)

(72) Inventors: Frederick M. Schwarz, Glastonbury, CT (US); Paul W. Duesler, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 578 days.

(21) Appl. No.: 14/598,252

(22) Filed: Jan. 16, 2015

(65) Prior Publication Data

US 2016/0208712 A1    Jul. 21, 2016

(51) Int. Cl.

| F02C 9/16 | (2006.01) |
|---|---|
| F01D 5/08 | (2006.01) |
| F01D 25/10 | (2006.01) |
| F02C 9/18 | (2006.01) |
| F02C 3/04 | (2006.01) |

(52) U.S. Cl.
CPC .................. *F02C 9/16* (2013.01); *F01D 5/08* (2013.01); *F01D 25/10* (2013.01); *F02C 3/04* (2013.01); *F02C 9/18* (2013.01); *F05D 2260/232* (2013.01); *F05D 2260/941* (2013.01); *F05D 2270/303* (2013.01); *Y02T 50/676* (2013.01)

(58) Field of Classification Search
CPC . F01D 5/046; F01D 5/08; F01D 11/24; F01D 25/10; F02C 9/16; F02C 9/18; F05D 2260/941
See application file for complete search history.

(56) References Cited

U.S. PATENT DOCUMENTS

| 4,645,417 | A | 2/1987 | Wisler | |
|---|---|---|---|---|
| 5,224,332 | A | 7/1993 | Schwarz et al. | |
| 6,685,425 | B2 | 2/2004 | Poccia et al. | |
| 2015/0345405 | A1* | 12/2015 | Schwarz | F01D 5/08 60/782 |
| 2016/0025014 | A1* | 1/2016 | Schwarz | F02C 9/18 60/39.1 |
| 2016/0123234 | A1* | 5/2016 | Forcier | F01D 5/087 60/805 |

FOREIGN PATENT DOCUMENTS

WO    2014186008 A2    11/2014

OTHER PUBLICATIONS

European Search Report for European Application No. 16151312.2 dated Jun. 1, 2016.

* cited by examiner

*Primary Examiner* — Arun Goyal
(74) *Attorney, Agent, or Firm* — Carlson, Gaskey & Olds, P.C.

(57) ABSTRACT

A gas turbine engine comprises a compressor rotor including blades and a disk, with a bore defined radially inwardly of the disk, and a combustor. A tap directs the products of combustion first to a valve and then into the bore of the disk. At least two temperature sensors sense a temperature of the products of combustion downstream of the valve. A control compares sensed temperatures from the at least two temperature sensors to ensure the at least two temperature sensors are functioning properly. The sensed temperatures are utilized to control the valve. A method of operating a gas turbine engine is also disclosed.

23 Claims, 3 Drawing Sheets

GAS TURBINE ENGINE CONTROL FOR ROTOR BORE HEATING

CROSS-REFERENCE TO RELATED APPLICATION

This application is a continuation-in-part of PCT Application Number PCT/US2014/015759, filed Feb. 11, 2014, which claims the benefit of U.S. Provisional Application No. 61/766,321, filed Feb. 19, 2013.

BACKGROUND OF THE INVENTION

This application relates to a method of providing heat to a rotor bore in a gas turbine engine at certain times during operation of an aircraft.

Gas turbine engines are known and when used on aircraft typically include a fan delivering air into a bypass duct and into a compressor section. Air from the compressor is passed downstream into a combustion section where it is mixed with fuel and ignited. Products of this combustion pass downstream over turbine rotors driving them to rotate.

Turbine rotors drive compressor and fan rotors. Historically, the fan rotor was driven at the same speed as a turbine rotor. More recently, it has been proposed to include a gear reduction between the fan rotor and a fan drive turbine. With this change, the diameter of the fan has increased dramatically and a bypass ratio or volume of air delivered into the bypass duct compared to a volume delivered into the compressor has increased. With this increase in bypass ratio, it becomes more important to efficiently utilize the air that is delivered into the compressor.

One factor that increases the efficiency of the use of this air is to have a higher pressure at the exit of a high pressure compressor. This high pressure results in a high temperature increase. The temperature at the exit of the high pressure compressor is known as $T_3$ in the art.

There is a stress challenge to an increasing $T_3$ on a steady state basis due largely to material property limits called "allowable stress" at a given maximum $T_3$ level. At the maximum, a further increase in a design $T_3$ presents challenges to achieve a goal disk life. In particular, as the design $T_3$ is elevated, a transient stress in the disk increases because the radially outer portions of a high pressure compressor rotor (i.e., the blades and outermost surfaces of the disk or blisk), which are in the path of air, see the increased heat rapidly when $T_3$ shoots up rapidly during a rapid power increase such as when the pilot increases power during a take-off roll. However, a rotor disk bore does not see the increased heat as immediately. Thus, there are severe stresses due to the thermal gradient between the disk bore and the outer rim region.

This thermal gradient challenge is greatest during the take-off of an aircraft engine and it is possible that the thermal stress in the disk is much greater than the stress due to the centrifugal force on the disk—particularly in the compressor where the blades are light. The engine has typically been at low speed or idle as the aircraft waits on the ground and then, just before take-off, the speed of the engine is increased dramatically. The thermal gradient stresses have led to the high pressure compressor often being operated at a lower pressure (and hence $T_3$) than would be optimum.

SUMMARY OF THE INVENTION

In a featured embodiment, a gas turbine engine comprises a compressor rotor including blades and a disk, with a bore defined radially inwardly of the disk, and a combustor. A tap directs the products of combustion first to a valve and then into the bore of the disk. At least two temperature sensors sense a temperature of the products of combustion downstream of the valve. A control compares sensed temperatures from the at least two temperature sensors to ensure the at least two temperature sensors are functioning properly. The sensed temperatures are utilized to control the valve.

In another embodiment according to the previous embodiment, the control is programmed to compare the sensed temperatures as a check on the accuracy of the at least two temperature sensors, and if the sensed temperatures are not equal, then comparing the sensed temperatures to an estimated temperature based upon another engine parameter.

In another embodiment according to any of the previous embodiments, the another engine parameter is rotor speed.

In another embodiment according to any of the previous embodiments, the valve is closed if the estimated temperature is not equal to any of the sensed temperatures, and if one of the sensed temperatures is close to the estimated temperature, then the temperature sensor associated with the one of the sensed temperatures is utilized to control the valve.

In another embodiment according to any of the previous embodiments, the control further senses a closed temperature of the supply line when the valve is closed, and if the temperature exceeds a pre-determined maximum, then reducing power supplied by the engine.

In another embodiment according to any of the previous embodiments, the valve is controlled to only be opened under certain periods of operation of the gas turbine engine.

In another embodiment according to any of the previous embodiments, the control is programmed to be open when an aircraft associated with the gas turbine engine is at idle or low speed, and to be closed at take-off and higher speed operation.

In another embodiment according to any of the previous embodiments, a second valve is provided to provide a redundant shutoff valve.

In another embodiment according to any of the previous embodiments, there are two of the taps, with each of the two taps including at least two temperature sensors and at least two of the valves.

In another embodiment according to any of the previous embodiments, the products of combustion are also delivered to a bore of a turbine section.

In another embodiment according to any of the previous embodiments, the tap is located within the combustor.

In another embodiment according to any of the previous embodiments, the two temperature sensors are mounted on a supply line receiving the tap.

In another embodiment according to any of the previous embodiments, the temperature sensors are mounted downstream of an outlet of a supply line.

In a further embodiment, a method of operating a gas turbine engine comprises the steps of directing the products of combustion first to a valve and then into a bore of a compressor rotor disk. The temperature of the directed products of combustion downstream of the valve are sensed with at least two temperature sensors. The sensed temperatures from the at least two temperature sensors are compared to ensure the at least two temperature sensors are functioning properly. The sensed temperatures are utilized to control the valve.

In another embodiment according to the previous embodiment, the two sensed temperatures are compared as a check on the accuracy of both sensed temperatures, and if the sensed temperatures are not equal, then the sensed temperatures are compared to an estimated temperature based upon another engine parameter.

In another embodiment according to any of the previous embodiments, rotor speed is used as the another engine parameter.

In another embodiment according to any of the previous embodiments, the valve is closed if the estimated temperature is not equal to either of the sensed temperatures, and if one of the sensed temperatures is close to the estimated temperature, then the one of the sensed temperatures is utilized to control the valve.

In another embodiment according to any of the previous embodiments, a temperature of the supply line is sensed when the valve is closed, and if the temperature exceeds a pre-determined maximum, then power supplied by the engine is reduced.

In another embodiment according to any of the previous embodiments, the valve is only opened under certain periods of operation of the gas turbine engine.

In another embodiment according to any of the previous embodiments, the valve is open when an aircraft associated with the gas turbine engine is at idle or low speed, and closed at take-off and higher speed operation.

In another embodiment according to any of the previous embodiments, a second valve is provided to provide a redundant shutoff valve.

In another embodiment according to any of the previous embodiments, there are two of the taps, with each of the two taps including at least two temperature sensors and at least two of the valves.

In another embodiment according to any of the previous embodiments, the two temperature sensors are mounted on a supply line receiving the tap.

In another embodiment according to any of the previous embodiments, the temperature sensors are mounted downstream of an outlet of a supply line.

In another embodiment according to any of the previous embodiments, the products of combustion in the combustor are directed first to the valve and then into the bore of the compressor rotor disk is performed within the combustor.

In another featured, a gas turbine engine comprises a compressor rotor including blades and a disk, with a bore defined radially inwardly of the disk, and a combustor including a burner nozzle. A tap directs the productions of combustion in the combustor through a valve, and into the bore of the disk.

These and other features may be best understood from the following drawings and specification.

DETAILED DESCRIPTION

Figure 1:
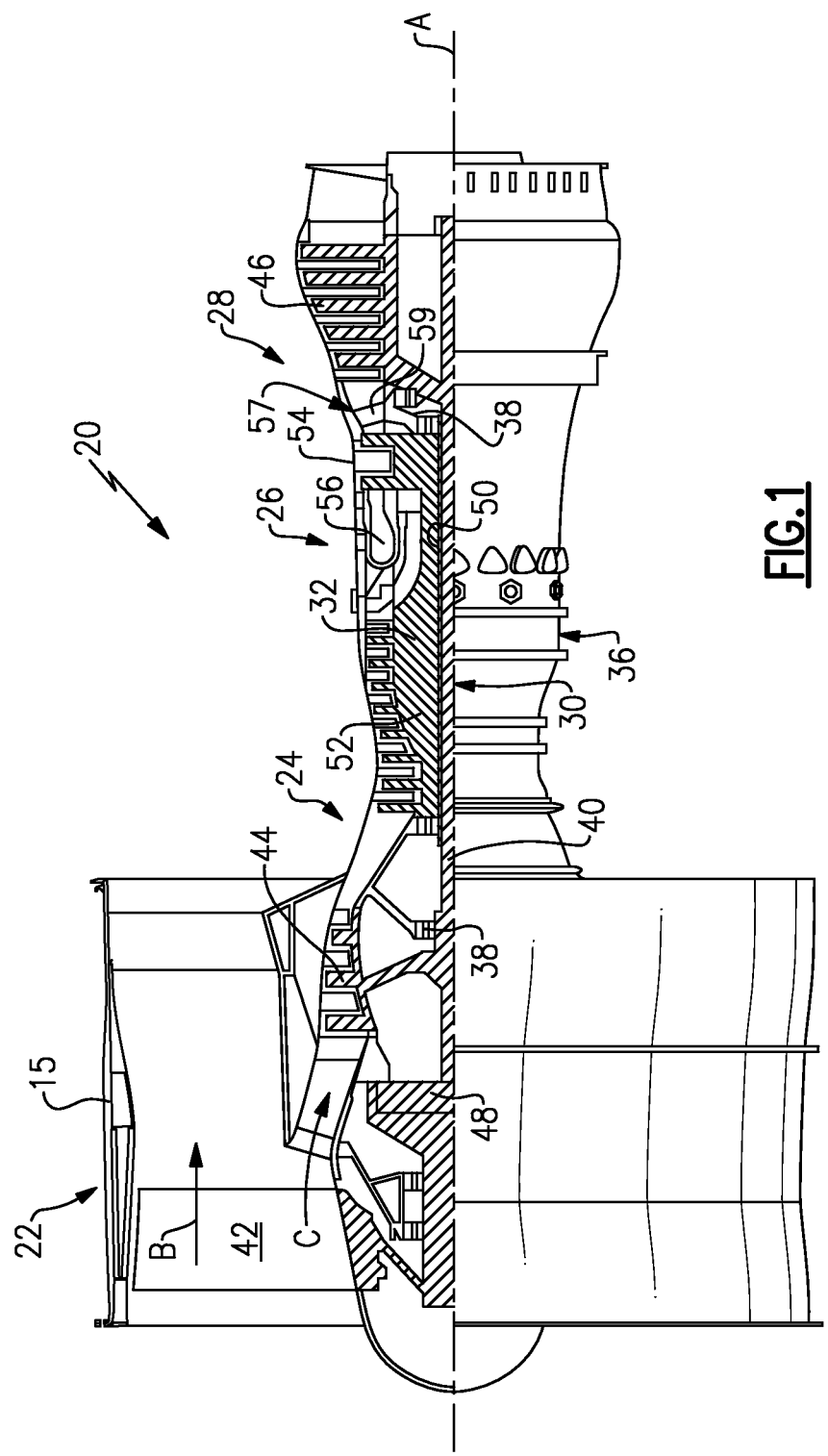
FIG. 1 shows a schematic of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

To facilitate discussion of the engine, the fan and gear architecture are often referred to as the engine propulsor. The compressor section, combustor and turbine section, on the other hand, are often referred to as the gas generator. However, other component groupings and descriptors may be utilized without limiting the nature or scope of the disclosed embodiments.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
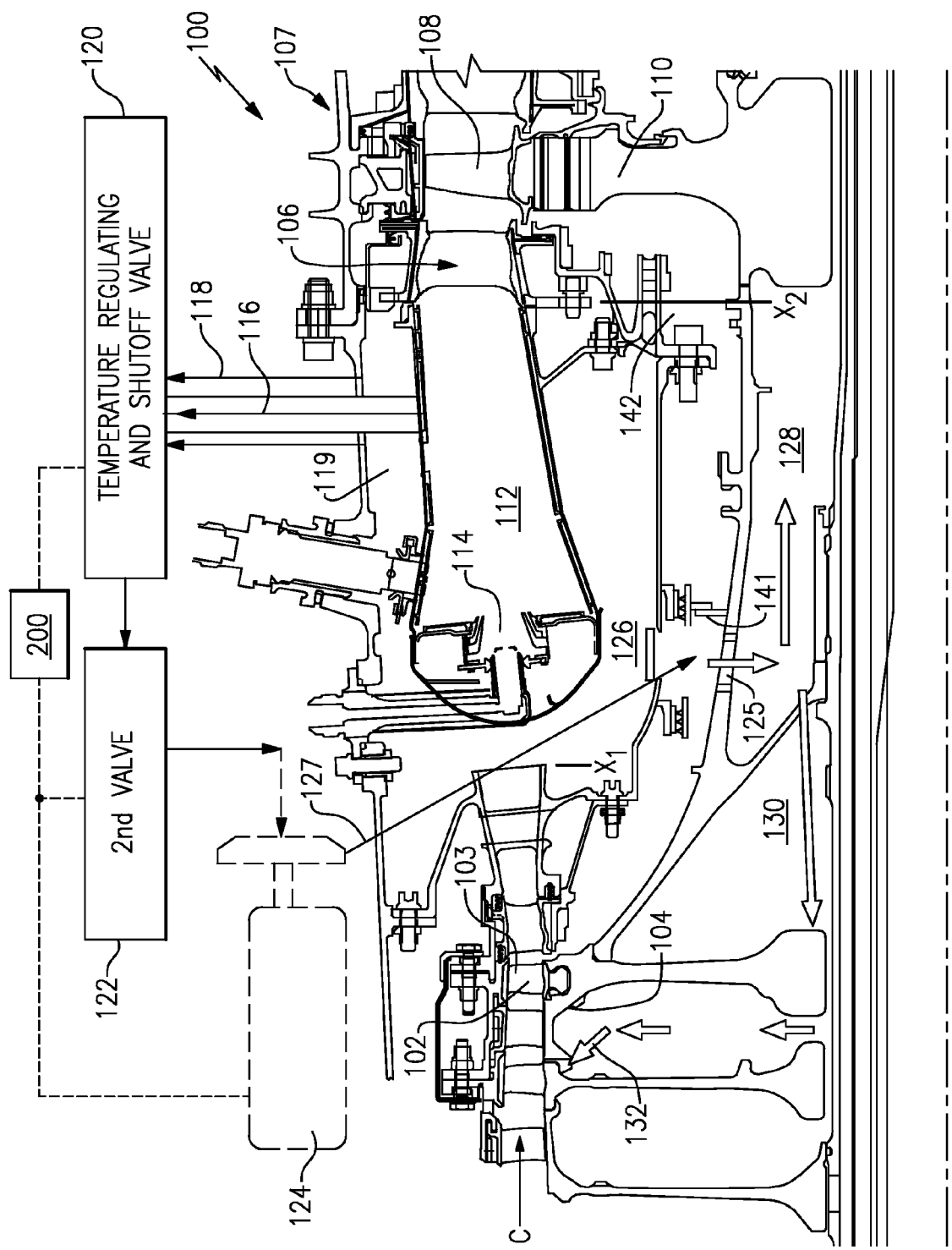
FIG. 2 shows a detail of a method for allowing an increase in a compressor exit temperature.

FIG. 2 shows an engine 100 incorporating a compressor section 102 having rotor blades 103 and a disk 104. A bore area sits radially inwardly of the disk 104. The thermal gradient between an inner surface of disk 104 and the outer region near the blades 103 is the stress challenge mentioned above. An "allowable stress" factors material strength at a given temperature to achieve a preferred flight-cycle fatigue life for the disk. For a commercial engine, the flight-cycle life might be 15,000 flights. If $T_3$, or temperature at the exit of the high pressure compressor, is increased while a disk is at its flight-cycle life, for example, to increase rated Sea Level Takeoff thrust to power a heavier aircraft, than the disk stress will rise above the allowable stress and the life of the disk may decrease.

As known, burner nozzles 114 are associated with a combustor 112. In accordance with this disclosure, a tap 116 removes hot air from the combustor 112 and delivers it through a temperature regulating and shutoff valve 120. This air will be delivered into a chamber 130 to preheat disk 104 as will be described below.

The tap 116 may be jacketed in a pipe 118, carrying air from a plenum chamber 119 outward of the combustor 112. The jacket insulates the tapped air and keeps it at a relatively high temperature. Also, the pipe or tap 116 (or other plumbing assembly) near the area of the combustor 112 will see temperatures well above two thousand (2000) degrees F. during take-off, and even up to this temperature at idle. It may therefore be necessary to cool tap 116 to reduce peak temperatures, and prevent failures that stem from oxidation corrosion.

The plenum chamber 119 typically would have air at an exit temperature of a high pressure compressor, or $T_3$ which might be above four hundred (400) degrees F. at idle and above one thousand (1000) degrees F. at takeoff. These temperatures would generally be at the point $X_1$ as shown in FIG. 2 and all around the combustor 112. At this time, inside the combustor 112, the air temperatures are well below two thousand (2000) degrees F. at idle and well above this temperature degrees F. at takeoff.

In general, it is desirable to increase the pressure of the air reaching the combustor 112, though this typically results in a higher temperature $T_3$ at point $X_1$. Thus, a higher pressure at point $X_1$ results in an increase in the thermal gradient challenge mentioned above. The air in the combustor 112 tapped at 116 is at a temperature known in the art as $T_4$, or is the temperature leaving the combustor 112 and approaching a first vane 106 of a turbine section 107. This is point $X_2$ of FIG. 2.

As shown, a turbine blade 108 is associated with the turbine disk 110. Similar to the above described thermal gradient challenge, with regard to that in the compressor, there is a thermal gradient challenge between the regions of the disk holding the blade 108 and the disk 110 of the rotor in the turbine section 107.

The hot air tapped from the combustor 112 may be over 1400 degrees when an engine is at idle or low speed. This temperature may be within an acceptable range to preheat disks 104 and 110. It might also be much hotter than 1400 degrees F. depending on the ambient temperature and the other demands on the engine such as cabin cooling bleed air being used, generator loads, and etc. Thus, even at idle, an unduly high temperature might be reduced by mixing in cooler air.

At takeoff power, the air in combustor 112 can approach temperatures of 2700° F. during high speed operation. It would be undesirable to have air at such high temperatures contacting disks 104 and 110. To remedy this problem, a relatively higher portion of cooling air is mixed with the tapped hot air, and the duration at which the engine is at takeoff power is monitored. During this process, once the disk 104 is calculated to be at a desired preheat temperature, which will occur relatively quickly, the preheat system is shut off by the valve 120.

The bore disk 109 is never exposed to the cool idle temperature, except perhaps during taxi or after landing, when the preheat system is not needed. Note that valve 120 may also turn on the preheat air tap 116 if the engine is at low power for a long period. As an example, an aircraft may operate at relatively low power, due to an air traffic delay after takeoff, and then the pilot may re-accelerate to climb power. The temperature regulating and shut off valve 120 is thus only open during certain periods of operation of the engine 100.

Downstream of the temperature regulating and shut off valve 120 there is a second valve 122. The second valve 122 is provided for failsafe operation. As mentioned, it would be undesirable for the air from tap 116 to leave the combustor and contact the disks 104, 110 during many periods of operation. The second valve increases the likelihood that at least one valve 120 or 122 will function to prevent this air from passing both valves 120 and 122 under certain conditions, as described below. If a valve fails to operate, the engine control sets a maintenance flag. If both fail to close, the engine control reduces power or shuts the engine down for safety reasons A small, motor driven, supplemental compressor 124 may be included in a flow path 127, if necessary for driving the air flow. However, the compressor 124 may not be necessary depending on the overall design pressures of the engine and the overall design pressures of the heating system. The flow path 127 may pass through a chamber 126 and opening 125 with labyrinth seals to access the rotating inner drum area, and then pass both upstream and downstream direction in the drum.

Air is shown passing upstream into chamber 130. The air in chamber 130 passes through a rotating passage or pipe 132 and is directed against the radially inner surfaces of the disk 104. The air also heats other areas that contact the air flow first, and the air loses heat all along its path. A reason why this system starts out with hot combustion air is that heat transfer typically reduces the air temperature along the way.

In addition, air flows downstream into chamber 128 and also heats the turbine disk 110, especially in the bore area.

As shown, a labyrinth seal 141 may be positioned in a chamber to prevent leakage of the hot air toward a diffuser case 142 inwardly of the vane 106.

The air tapped at 116 may be above 1400° F. at low power or idle operation, and upwards of 2700° F. at takeoff. The air in the chamber 119 may be on the order of 400° during low speed operation. The disclosed system preheats the disk 104 prior to the engine 100 entering takeoff mode at which the blades 103 will experience a rapid increase in temperature. Preheating the disk to, e.g., 800 degrees, F, allows the $T_3$ temperature to be very high. Notably, it may be desirable to preheat the disk 104 to a temperature that is actually higher than the $T_3$ temperature at low speed operation.

In a method of operating an engine 100, a control 200 for the engine 100 may direct hot air from tap 116 into the bore 130 of the compressor 130 and into the turbine section 107 bore by opening valves 120 and 122. This flow may occur before take-off of an aircraft associated with the engine 110 and during low speed operation such as taxi or idle.

The valves 120 and 122 are then closed prior to take-off. Thus, the extreme high temperatures generated in the combustor 112 at take-off are not delivered into the bores.

While tap 116 is in the combustor 112, it is possible to tap the air from other locations downstream of the combustor 112, say in the turbine section 107. Such air has already been heated in the combustor 112.

With this preheat system, the disk 104 of the compressor is preheated much closer to the temperatures the blade 103 reaches at take-off. This allows an increased pressure at point $X_1$. With higher pressure comes higher temperatures, but this system allows the compressor to experience such higher temperatures. The resulting higher pressures reaching combustor 112 dramatically increase combustion efficiency.

In addition, it is desirable to have periodic self-tests on the operation of the valves 120 and 122 to ensure that they are both available and to ensure the redundant and failsafe operation. Accordingly, the system may cycle full open and full closed, for example, immediately after engine start and the valve positions reported to the electronic engine control 200.

Figure 3A:
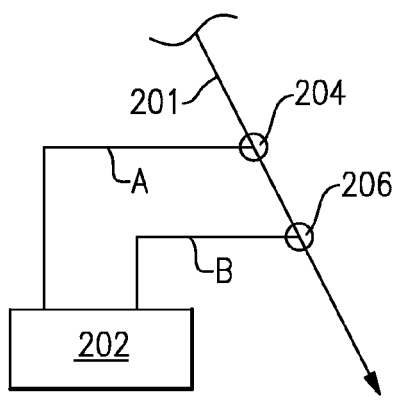
FIG. 3A shows a control embodiment.

FIG. 3A shows an alternate control 202 which may be incorporated into a system such as shown in FIG. 2. The supply line 127 of FIG. 2 is replaced by a supply line 201, which may be incorporated into a system otherwise structured and controlled as in FIG. 2. Thermocouples 204 and 206 are placed on the supply line 201, downstream of the valves. While thermocouples are disclosed, other temperature sensors may be used. The redundant thermocouples ensure that the failure of one thermocouple will not lead to a lack of accurate information with regard to the temperature of the gases in the supply line 201. As mentioned above, it is important that these temperatures not exceed a predetermined maximum.

Figure 3B:
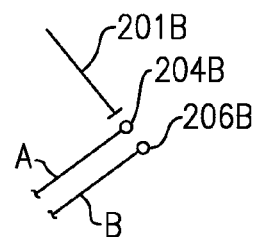
FIG. 3B shows a second control embodiment

While the thermocouples 204 and 206 are on the supply line 201 in the FIG. 3A embodiment, FIG. 3B shows an alternative embodiment wherein the supply line 201B has an outlet, and the thermocouples 204B and 206B are downstream of the outlet, and mounted within the engine. This embodiment may reduce the complexity of providing electric communication.

Figure 4:
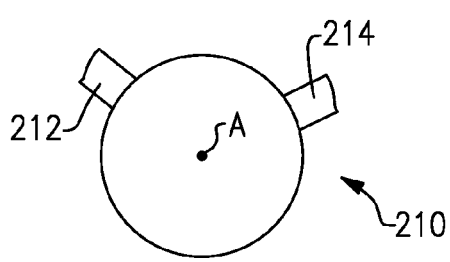
FIG. 4 shows another embodiment of the tapping system.

FIG. 4 shows another embodiment 210 of an engine again centered on line A. Engine 210 has two circumferentially spaced redundant taps 212 and 214. Each may be structured as tap 116 (with all associated downstream structure), generally disclosed in FIG. 2. Again, the provision of redundant supplies will ensure that a failure on either of the valving systems will not result in a failure to provide the heating. Rather, should one fail, one of the two valving systems can be shut down, with another left operational.

Figure 5:
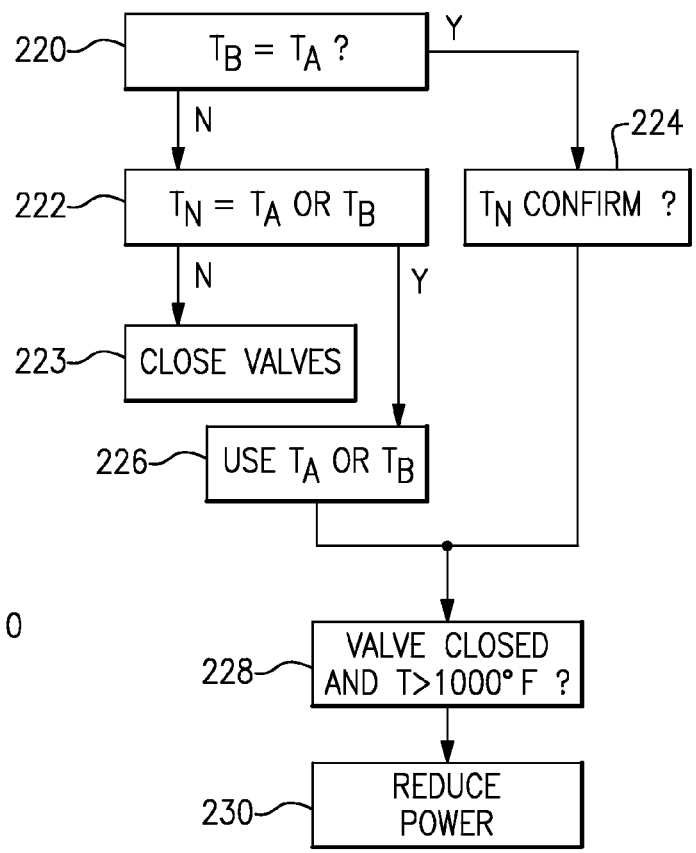
FIG. 5 is a control flow chart.

FIG. 5 shows a control flow chart. In a step 220, the control 202 asks whether the temperature $T_A$ from the thermocouple 304 is equal to the temperature $T_B$ from the thermocouple 206. While the step 220 indicates the question is whether they are equal, it may simply be a comparison to ensure they are within some small percentage (for example 5%) of each other. For purposes of interpreting the claims of this application, the word "equal" should be interpreted this way.

If they are not equal, then at step 222, the control 202 estimates a temperature based on the engine speed $T_N$. The $T_N$ is compared to both temperatures $T_A$ and $T_B$. If $T_N$ is equal to one of the two temperatures, then the $T_A$ or $T_B$ which is close to the estimated $T_N$ is utilized. If $T_N$ is not equal to $T_A$ or $T_B$, then the valves are closed at step 223.

If a system with redundant taps is utilized, such as in engine 210, one of taps 212/214 may be closed while the other continues to supply gas to heat the bore.

Returning to step 220, if $T_A$ is generally equal to $T_B$, then the temperatures are compared to the $T_N$ to confirm the system is properly functioning at step 224.

At step 228, the system also asks whether when the valves are closed, with the $T_A$ and/or $T_B$ still being utilized, and whether the sensed temperature is above some maximum temperature (and here 1000° F.). If it is, then the power for the system is reduced. Alternatively, the engine may be shut down. However, the redundant controls may allow the engine to continue to operate to provide some thrust even though there is a concern indicated at step 228 by lowering power.

As can be appreciated, the control ensures the temperature reaching the compressor disk bore will not be unduly high. Several valves can be controlled to mix the tapped air to achieve a desired temperature. Of course, a control can also shut the valves down should the temperature be so high that it cannot be utilized.

Should any of the thermocouples be found to be faulty, a maintenance flag is set. Further, the entire system should be periodically monitored, and a full system health check provided periodically, such as every $10^{th}$ ground idle operation.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor rotor including blades and a disk, with a bore defined radially inwardly of said disk;
   a combustor;
   a tap for directing the products of combustion into a supply line, and first to a first valve and then into said bore of said disk; and
   at least two temperature sensors for sensing a temperature of said products of combustion downstream of said first valve, and a control comparing sensed temperatures from said at least two temperature sensors to ensure said at least two temperature sensors are functioning properly, said sensed temperatures being utilized to control said first valve; and a second valve being provided between the tap and the bore to provide a redundant shutoff valve.

2. The gas turbine engine as set forth in claim 1, wherein the control is programmed to compare the sensed temperatures as a check on accuracy of the at least two temperature sensors, and if the sensed temperatures are not equal, then comparing said sensed temperatures to an estimated temperature based upon another engine parameter.

3. The gas turbine engine as set forth in claim 2, wherein said another engine parameter is rotor speed.

4. The gas turbine engine as set forth in claim 2, wherein said first valve is closed if said estimated temperature is not equal to any of said sensed temperatures, and if one of said sensed temperatures is close to said estimated temperature, then one of the at least two temperature sensors associated with said one of said sensed temperatures is utilized to control said first valve.

5. The gas turbine engine as set forth in claim 4, wherein said control further sensing a closed temperature of said supply line when said first valve is closed, and if said closed temperature exceeds a pre-determined maximum, then reducing a power supplied by said engine.

6. The gas turbine engine as set forth in claim 1, wherein said first valve is controlled to only be opened under certain periods of operation of the gas turbine engine.

7. The gas turbine engine as set forth in claim 6, wherein the control is programmed to be open when an aircraft associated with the gas turbine engine is at idle or low speed, and to be closed at take-off and higher speed operation.

8. The gas turbine engine as set forth in claim 1, wherein said tap comprises two taps, with each of said two taps including said at least two temperature sensors and at least one each of said first valve and said second valve.

9. The gas turbine engine as set forth in claim 1, wherein the products of combustion are also delivered to a bore of a turbine section.

10. The gas turbine engine as set forth in claim 1, wherein the tap is located within the combustor.

11. The method set forth in claim 10, wherein the step of directing the products of combustion in the combustor first to the first valve and then into the bore of the compressor rotor disk is performed from within the combustor.

12. The gas turbine engine as set forth in claim 1, wherein said at least two temperature sensors are mounted on said supply line receiving said tap.

13. The gas turbine engine as set forth in claim 1, wherein said at least two temperature sensors are mounted downstream of an outlet of said supply line.

14. A method of operating a gas turbine engine comprising the steps of:

directing the products of combustion from a tap into a supply line, and first to a first valve and then into a bore of a compressor rotor disk; and sensing the temperature of said directed products of combustion downstream of said first valve with at least two temperature sensors, comparing the sensed temperatures from said at least two temperature sensors to ensure said at least two temperature sensors are functioning properly, said sensed temperatures being utilized to control said first valve; and a second valve is provided between the tap and the bore to provide a redundant shutoff valve.

15. The method as set forth in claim 14, further including the step of comparing the two sensed temperatures as a check on accuracy of both sensed temperatures, and if the sensed temperatures are not equal, then comparing said sensed temperatures to an estimated temperature based upon another engine parameter.

16. The method as set forth in claim 15, further including the step of using rotor speed as said another engine parameter.

17. The method as set forth in claim 16, further including the step of closing said first valve if said estimated temperature is not equal to either of said sensed temperatures, and if one of said sensed temperatures is close to said estimated temperature, then said one of said sensed temperatures is utilized to control said first valve.

18. The method as set forth in claim 14, further including the step of sensing a closed temperature of said supply line when said valve is closed, and if said closed temperature exceeds a predetermined maximum, then reducing a power supplied by said engine.

19. The method as set forth in claim 14, wherein said first valve is only opened under certain periods of operation of the gas turbine engine.

20. The method as set forth in claim 19, wherein said first valve is open when an aircraft associated with the gas turbine engine is at idle or low speed, and closed at take-off and higher speed operation.

21. The method as set forth in claim 14, wherein said tap comprises two taps, with each of said two taps including said at least two temperature sensors and at least one each of said first valve and said second valve.

22. The method as set forth in claim 14, wherein said at least two temperature sensors are mounted on said supply line receiving said tap.

23. The method as set forth in claim 14, wherein said at least two temperature sensors are mounted downstream of an outlet of said supply line.

* * * * *